(12) United States Patent
Bachmutsky et al.

(10) Patent No.: US 7,779,245 B2
(45) Date of Patent: Aug. 17, 2010

(54) PROVIDING ACCESS BEARER RELATED INFORMATION IN A PACKET DATA NETWORK

(75) Inventors: Alex Bachmutsky, Sunnyvale, CA (US); Vesa Hellgren, Helsinki (FI)

(73) Assignee: Nokia Corporation, Espoo (FI)

( * ) Notice: Subject to any disclaimer, the term of this patent is extended or adjusted under 35 U.S.C. 154(b) by 1454 days.

(21) Appl. No.: 11/114,199

(22) Filed: Apr. 26, 2005

(65) Prior Publication Data

US 2006/0185002 A1      Aug. 17, 2006

(30) Foreign Application Priority Data

Feb. 17, 2005   (FI)   .................................. 20050187

(51) Int. Cl.
*H04L 29/06* (2006.01)
(52) U.S. Cl. ........................ 713/153; 726/3; 709/226; 709/228; 709/229
(58) Field of Classification Search .................. None
See application file for complete search history.

(56) References Cited

U.S. PATENT DOCUMENTS 6,711,141 B1 *   3/2004   Rinne et al. .................. 370/328

2002/0155825 A1 *  10/2002  Haumont et al. ............ 455/412
2002/0199008 A1    12/2002  Pecen et al.
2003/0058874 A1     3/2003  Sahaya et al.
2004/0071127 A1     4/2004  Hurtta
2004/0148425 A1     7/2004  Haumont et al.
2006/0285512 A1 *  12/2006  Lee et al. .................... 370/328

FOREIGN PATENT DOCUMENTS

WO   WO 2005/015934 A   2/2005

* cited by examiner

*Primary Examiner*—Jung Kim
(74) *Attorney, Agent, or Firm*—Alston & Bird LLP

(57) ABSTRACT

The invention discloses providing access bearer related information in a packet data network comprising network entities including an access processor for processing access requests, a service processor for processing service requests, and at least one service entity for providing services. An access bearer identification is obtained for a data packet to be transmitted between two of the network entities. The access bearer identification indicates the access bearer that the data packet is associated with. The access bearer identification is combined with the data packet. The combined access bearer identification and data packet is transmitted. The received access bearer identification is extracted. The invention allows providing additional identification information about the PDP context of a data packet while the data packet is being redirected between service entities, access processors, and service processors independent from each other.

21 Claims, 3 Drawing Sheets

PROVIDING ACCESS BEARER RELATED INFORMATION IN A PACKET DATA NETWORK

BACKGROUND OF THE INVENTION

1. Field of the Invention

The invention relates to telecommunications. In particular, the invention relates to providing access bearer related information in a packet data network.

2. Description of the Related Art

Recently also mobile communication networks have started to support transmission of packet switched data or packet data in addition to traditional circuit switched data transmission.

An example of a technique allowing packet data transmission for mobile communication networks is General Packet Radio Service (GPRS). GPRS is designed to support e.g. digital mobile telecommunication networks based on the Global System for Mobile Communications (GSM) standard. However, GPRS is not restricted to only GSM networks but may support for example $3^{rd}$ Generation Partnership Project (3GPP) based digital mobile telecommunication networks. Other examples of mobile packet data networks are Wireless Local Area Network (WLAN) based mobile communication networks, Code Division Multiple Access (CDMA) based mobile communication networks, Wideband Code Division Multiple Access (WCDMA) based mobile communication networks, Mobile IP (Internet Protocol) based mobile communication networks and Enhanced Data Rates for Global Evolution (EDGE) based mobile communication networks.

A GPRS based mobile communication network comprises supplementary network elements or nodes in addition to existing network elements. These include a Serving GPRS Support Node (SGSN) and a Gateway GPRS Support Node (GGSN). A Serving GPRS Support Node typically delivers packets to and from GPRS enabled terminal devices within its service area. A Gateway GPRS Support Node is typically used as an interface to external IP networks such as the Internet, other mobile service providers' GPRS services, or enterprise intranets.

The introduction of packet data based mobile communication networks has resulted in various value-added subscriber services being provided for these packet data based mobile communication networks. Examples of such subscriber services are packet data based voice, email, content downloading, browsing, streaming and rich calls. Furthermore, packet data based mobile communication networks typically offer network services to support the usage of subscriber services. Such network services include e.g. rerouting, barring, accounting, content proxy services, content blocking services, firewall services, virus scanning services, performance enhancement proxy services, Virtual Private Network (VPN) services, various Quality of Service (QoS) related services and various charging related services for both online and offline charging. Unless otherwise stated, in the following the term 'service' is used to refer to both the above value-added subscriber services and the network services supporting them.

A recent trend is to provide the above services by utilizing independent service entities. The term 'independent' here refers to the service entities being functionally separate from other network elements. For example, virus scanning services are provided by an independent virus scanning service entity rather than e.g. by a Serving GPRS Support Node or a Gateway GPRS Support Node. Since a service entity is functionally separate from other network elements, it may be implemented as a stand-alone network element physically separate from other network elements. Alternatively, a service entity may be implemented e.g. as a functionally separate software component integrated into a single network element, e.g. into a Gateway GPRS Support Node. Naturally, also several service entities may be integrated into a single physical network element.

The trend of independent service entities necessitates implementation of service processing functions. The service processing functions determine which service or services are to be applied to a given data packet or a traffic flow, and then distribute the data packet or traffic flow to the service entity or entities accordingly. Furthermore, the service processing functions may generate and utilize service rules indicating which service entities and in which order are to be utilized for providing various services. In other words, the service processing functions allow differentiating the distinct service data flows related to various services, so that it is not necessary to have a separate access bearer, e.g. a PDP context, for each service. The service processing functions are able to manage, charge and route these distinct traffic flows, whereas a service entity provides an actual service or services and handles signaling related to the service or services. For example, a home agent of a Mobile IP network, a Traffic Plane Function (TPF) of a 3GPP network, and a Performance Enhancement Proxy (PEP) provide service processing functions.

Typically the service processing functions and the access processing functions have been provided by a single network entity. The term 'access processing functions' refers to functions for processing requests to access at least one of the mobile packet data network and external networks the mobile packet data network is connected to. For example, a Gateway GPRS Support Node of a GPRS network and a Packet Data Gateway (PDG) of a WLAN network provide access processing functions.

An even more recent trend, however, is to provide the service processing functions by utilizing one independent network entity and the access processing functions by utilizing another independent network entity. The term 'independent' here again refers to the network entities being functionally separate from other network elements. In other words, the service processing functions are provided by a network entity—a service processor—that is functionally separate from the network entity that provides the access processing functions—an access processor. As the access processor and the service processor are functionally separate from each other, they may be implemented as stand-alone network elements physically separate from each other, or they may be implemented e.g. as functionally separate software components integrated into a single physical network element, e.g. into a Gateway GPRS Support Node.

However, the above separation of access processing, service processing and service providing creates problems in certain situations. More specifically, when a data packet is redirected between the independent service entities, the access processor, and the service processor, no information about the PDP (Packet Data Protocol) context of the data packet is conveyed. As is known in the art, the term 'PDP context' refers to a set of information describing a wireless session and used in a GPRS network by terminal devices and GPRS Support Nodes for identifying the session. The PDP context comprises information related to e.g. routing, Quality of Service, security and billing. Since no information about the PDP context of the data packet is conveyed between the above independent service entities, access processor and service processor, neither service based Quality of Service nor Quality of Service based charging can be implemented. The IP address of a terminal device is the same in all secondary PDP contexts: therefore without additional identification information about the PDP context, the secondary PDP context of a data packet cannot be known. As a result, service based Quality of Service or Quality of Service based charging cannot be implemented.

Prior art includes application US 2003/0058874 of Sahaya et al., filed Sep. 19, 2002, which is commonly assigned with the present application. The disclosure of this application is incorporated by reference herein. US 2003/0058874 discloses a system and method for providing a Mobile Edge Service in a mobile network.

Therefore, the object of the present invention is to alleviate the problems described above and to introduce a mechanism that allows providing additional identification information about at least the PDP context of a data packet while the data packet is being redirected between the above independent service entities, access processor and service processor.

SUMMARY OF THE INVENTION

A first aspect of the present invention is a method of providing access bearer related information in a packet data network which comprises independent network entities including an access processor for processing access requests, a service processor for processing service requests, and at least one service entity for providing services. In accordance with the method of the present invention, an access bearer identification is obtained for a data packet to be transmitted between two of the above independent network entities. The access bearer identification indicates an access bearer that the data packet is associated with. The obtained access bearer identification is combined with the data packet. The combined access bearer identification and data packet are transmitted. It is to be understood that the terms 'access processor' service processor', and 'service entity' are herein used to refer to independent network entities as described above. Furthermore, it is to be understood that the term 'access bearer' is used herein to refer to an information transmission path of defined property, e.g. of a security tunnel, which access bearer is explicitly established across an access network, between a terminal device and an access terminating gateway. One example of access bearer is the PDP context in a GPRS system.

A second aspect of the present invention is a system of providing access bearer related information in a packet data network which comprises independent network entities including an access processor for processing access requests, a service processor for processing service requests, and at least one service entity for providing services. The system in accordance with the second aspect of the present invention comprises an access bearer identification combiner for combining an obtained access bearer identification with a data packet to be transmitted between two of the independent network entities. The obtained access bearer identification indicates an access bearer that the data packet is associated with. The system further comprises an access bearer identification transmitter for transmitting the combined access bearer identification and data packet.

A third aspect of the present invention is a system of providing access bearer related information in a packet data network which comprises independent network entities including an access processing means for processing access requests, a service processing means for processing service requests, and at least one service entity for providing services. It is to be understood that the terms 'access processing means' and 'service processing means' are herein also used to refer to independent network entities as described above. The system in accordance with the third aspect of the present invention comprises an access bearer identification combining means for combining an obtained access bearer identification with a data packet to be transmitted between two of the independent network entities. The obtained access bearer identification indicates an access bearer that the data packet is associated with. The system further comprises an access bearer identification transmitting means for transmitting the combined access bearer identification and data packet.

A fourth aspect of the present invention is an access processor for processing access requests in a packet data network. The access processor in accordance with the fourth aspect of the present invention comprises an access bearer identification combiner for combining an obtained access bearer identification with a data packet to be transmitted to one of: a service entity for providing services and a service processor for processing service requests. The access bearer identification indicates an access bearer that the data packet is associated with. The access processor further comprises an access bearer identification transmitter for transmitting the combined access bearer identification and data packet.

A fifth aspect of the present invention is a service processor for processing service requests in a packet data network. The service processor in accordance with the fifth aspect of the present invention comprises an access bearer identification combiner for combining an access bearer identification with a data packet to be transmitted to one of: a service entity for providing services and an access processor for processing access requests. The access bearer identification indicates an access bearer that the data packet is associated with. The service processor further comprises an access bearer identification transmitter for transmitting the combined access bearer identification and data packet.

A sixth aspect of the present invention is a service entity for providing services in a packet data network. The service entity in accordance with the sixth aspect of the present invention comprises an access bearer identification combiner for combining an access bearer identification with a data packet to be transmitted to one of: an access processor for processing access requests and a service processor for processing service requests. The access bearer identification indicates an access bearer that the data packet is associated with. The service entity further comprises an access bearer identification transmitter for transmitting the combined access bearer identification and data packet.

A seventh aspect of the present invention is a computer program embodied on a computer readable medium for providing access bearer related information in a packet data network which comprises independent network entities including an access processor for processing access requests, a service processor for processing service requests, and at least one service entity for providing services. The computer program in accordance with the seventh aspect of the present invention controls a data-processing device to perform the steps of: obtaining, for a data packet to be transmitted between two of the independent network entities, an access bearer identification indicating an access bearer the data packet is associated with; combining the obtained access bearer identification with the data packet; and transmitting the combined access bearer identification and data packet.

In an embodiment of the invention, the received access bearer identification is extracted. Next, the received data packet is processed by utilizing the received access bearer identification, after which feedback information is transmitted back to the independent network entity from which the combined access bearer identification and data packet was received. The feedback information indicates results of the processing.

In an embodiment of the invention, the access bearer identification comprises a PDP Context identifier indicating the PDP Context the data packet is associated with.

In an embodiment of the invention, the access bearer identification further comprises at least one of: a service data flow identifier indicating a service data flow the data packet is associated with; a packet flow identifier indicating a packet flow the data packet is associated with; and a service rule base identifier indicating a service rule base to be used for the data packet, which service rule base maps service data flow specific service rules together. It is to be understood that the term 'packet flow' is herein used to refer to a specific user data flow. Furthermore, it is to be understood that the term 'service data flow' is herein used to refer to an aggregate set of packet flows. In other words, an access bearer, e.g. a PDP context, comprises at least one service data flow and each service data flow comprises at least one packet flow.

In an embodiment of the invention, at least one service rule base mapping service data flow specific service rules together is defined; and a transport identifier is assigned to each defined service rule base. The transport identifier indicates a transport method. Then, the combined access bearer identification and data packet is transmitted according to the transport method indicated by the transport identifier assigned to the service rule base to be used for the data packet.

The invention allows providing additional identification information about the PDP context of a data packet while the data packet is being redirected between service entities, access processors, and service processors independent from each other. Furthermore, the invention allows providing additional identification information about the traffic flow the data packet is associated with, as well as about the service rule base to be used for the data packet. As a result, the invention allows implementation of service based Quality of Service and Quality of Service based charging even in mobile packet data networks comprising service entities, access processors, and service processors independent from each other.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE PREFERRED EMBODIMENTS

Reference will now be made in detail to the embodiments of the invention, examples of which are illustrated in the accompanying drawings.

Figure 1:
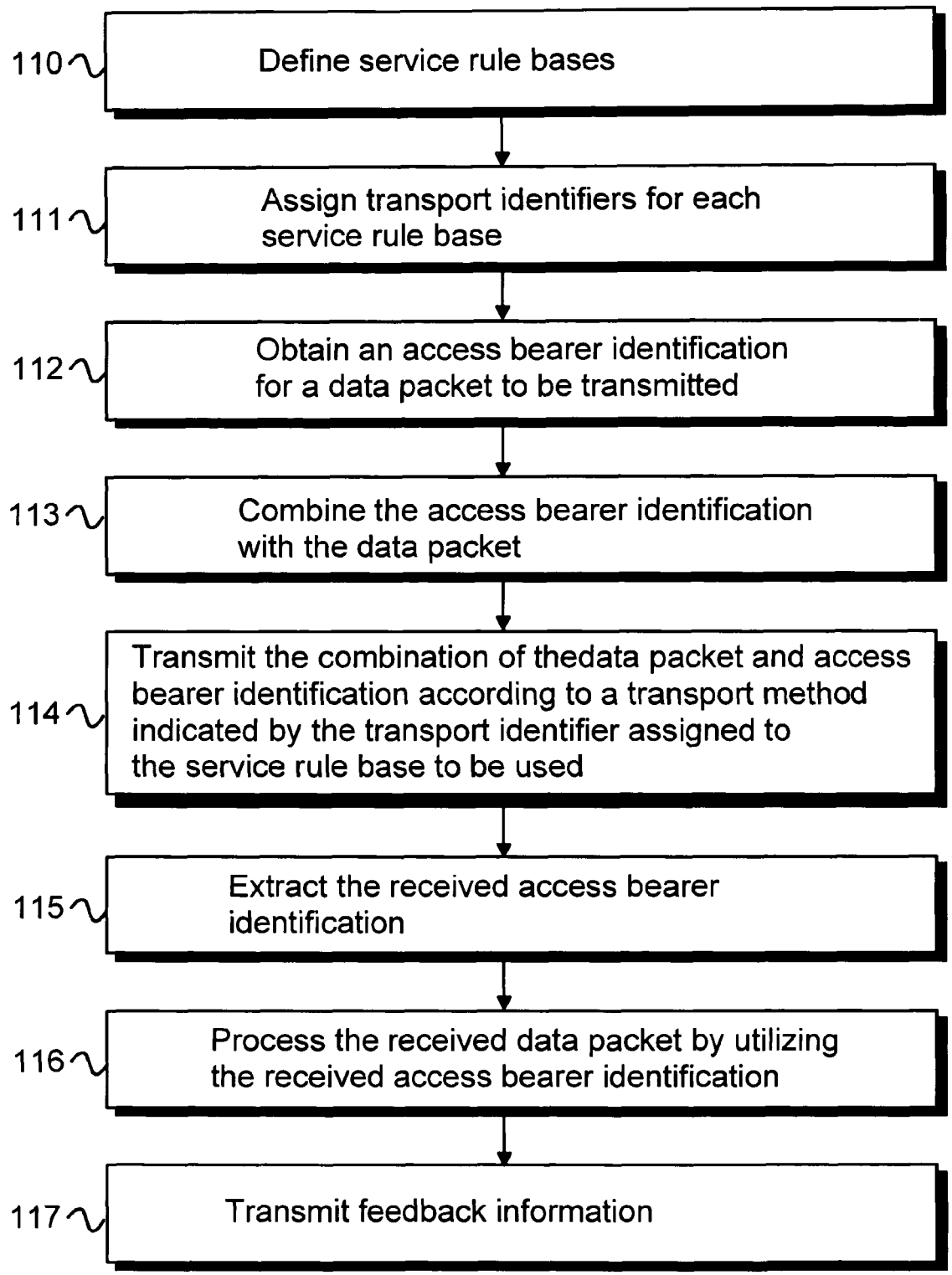
FIG. 1 is a flow diagram illustrating another method according to an embodiment of the present invention.

FIG. 1 illustrates an exemplary embodiment of the method of the present invention relating to providing access bearer related information in a packet data network which comprises independent network entities including an access processor for processing access requests, a service processor for processing service requests, and at least one service entity for providing services.

At step 110, at least one service rule base is defined. The at least one rule base maps service data flow specific service rules together. Next, a unique transport identifier is assigned to each defined service rule base, step 111. Each transport identifier indicates a transport method. A transport identifier may be e.g. a port number, a VLAN (Virtual Local Area Network) identifier, a MPLS (Multiprotocol Label Switching) label, a L2TP (Layer 2 Tunneling Protocol) tunnel identifier or a L2TP session identifier, an IP address, or an IPSec (IP Security Protocol) security association.

At step 112, an access bearer identification is obtained for a data packet to be transmitted between the service entity and the access processor, or between the service entity and service processor, or between the access processor and the service processor. The access bearer identification indicates the access bearer that the data packet is associated with. In the exemplary embodiment of the present invention illustrated in FIG. 1, the access bearer identification comprises a PDP Context identifier indicating the PDP Context the data packet is associated with.

At step 113, the obtained access bearer identification is combined with the data packet. At step 114, the combination of the access bearer identification and data packet is transmitted to the service entity, the access processor or the service processor to which the data packet is addressed. In the exemplary embodiment of the present invention illustrated in FIG. 1, the combination of the access bearer identification and data packet is more specifically transmitted according to such a transport method that is indicated by the transport identifier that was assigned to the service rule base to be utilized for the data packet. For example, if the transport identifier is a certain port number, the combined data packet and access bearer identification will be transmitted to a corresponding port at the receiving network entity. Thus, the receiving service entity, access processor or service processor knows which service rule base to apply for the received data packet based on the transport method according to which the combination of the access bearer identification and data packet was received. Furthermore, for a receiving access processor, the transport method according to which the combination of the access bearer identification and data packet was received may also indicate at least one of an Access Point Name (APN) and access technology to be used. Furthermore, for a receiving service processor, the transport method according to which the combination of the access bearer identification and data packet was received may also indicate a sAP. As is known in the art, a sAP defines additional instances of a Gi interface for a PDP session. Alternatively, in the case of WLAN, a sAP defines additional instances of a Wi interface.

At step 115, the received access bearer identification is extracted by the receiving service entity, access processor or service processor. At step 116, the receiving service entity, access processor or service processor processes the received data packet by utilizing the received access bearer identification. For example, services may be applied to the data packet according to the implicitly or explicitly indicated service rule base. Finally, at step 117, feedback information indicating results of the processing is transmitted back to the independent network entity from which the combined access bearer identification and data packet was received. The feedback information may comprise e.g. a return code indicating that the data packet was processed successfully, or that the data packet was dropped, or that the data packet was ignored, or that the PDP context identifier was unrecognized. Furthermore, the feedback information may comprise additional information about services applied.

Figure 2:
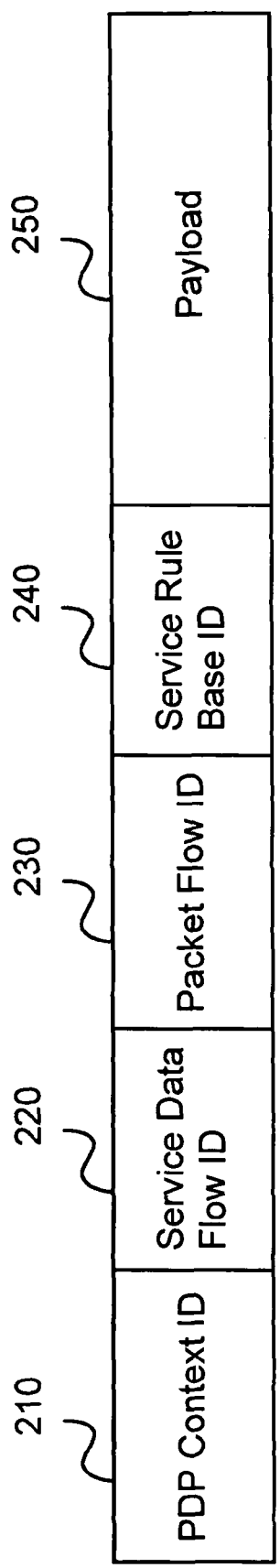
FIG. 2 illustrates a header structure used to implement an embodiment of the present invention, and FIG. 3 block diagram illustrating a system according to an embodiment of the present invention.

FIG. 2 illustrates an exemplary header structure used to implement an embodiment of the present invention. As described in reference to FIG. 1, the access bearer identification may comprise a PDP Context identifier indicating the PDP Context the data packet is associated with. The access bearer identification may further comprise a service data flow identifier indicating a service data flow the data packet is associated with. The access bearer identification may further comprise a packet flow identifier indicating a packet flow the data packet is associated with. In an embodiment alternative to that illustrated in FIG. 1 in which a service rule base to be used is implicitly indicated by transmitting the combination of the data packet and access bearer identification according to a certain transport method, the service rule base to be used for the data packet may be explicitly indicated by a service rule base identifier comprised in the access bearer identification. One exemplary way to implement the access bearer identification is to pass the access bearer identification in an additional header attached to the data packet, as illustrated in FIG. 2. In other words, tunneling may be used to carry the combination of the access bearer identification and data packet. FIG. 2 illustrates the structure of one such exemplary header. The header includes field 210 containing the PDP Context identifier. The header further includes field 220 containing the service data flow identifier. The header further includes field 230 containing the packet flow identifier. The header further includes field 240 containing the service rule identifier. Field 250 of FIG. 2 comprises the actual payload, that is, the data packet itself.

Figure 3:
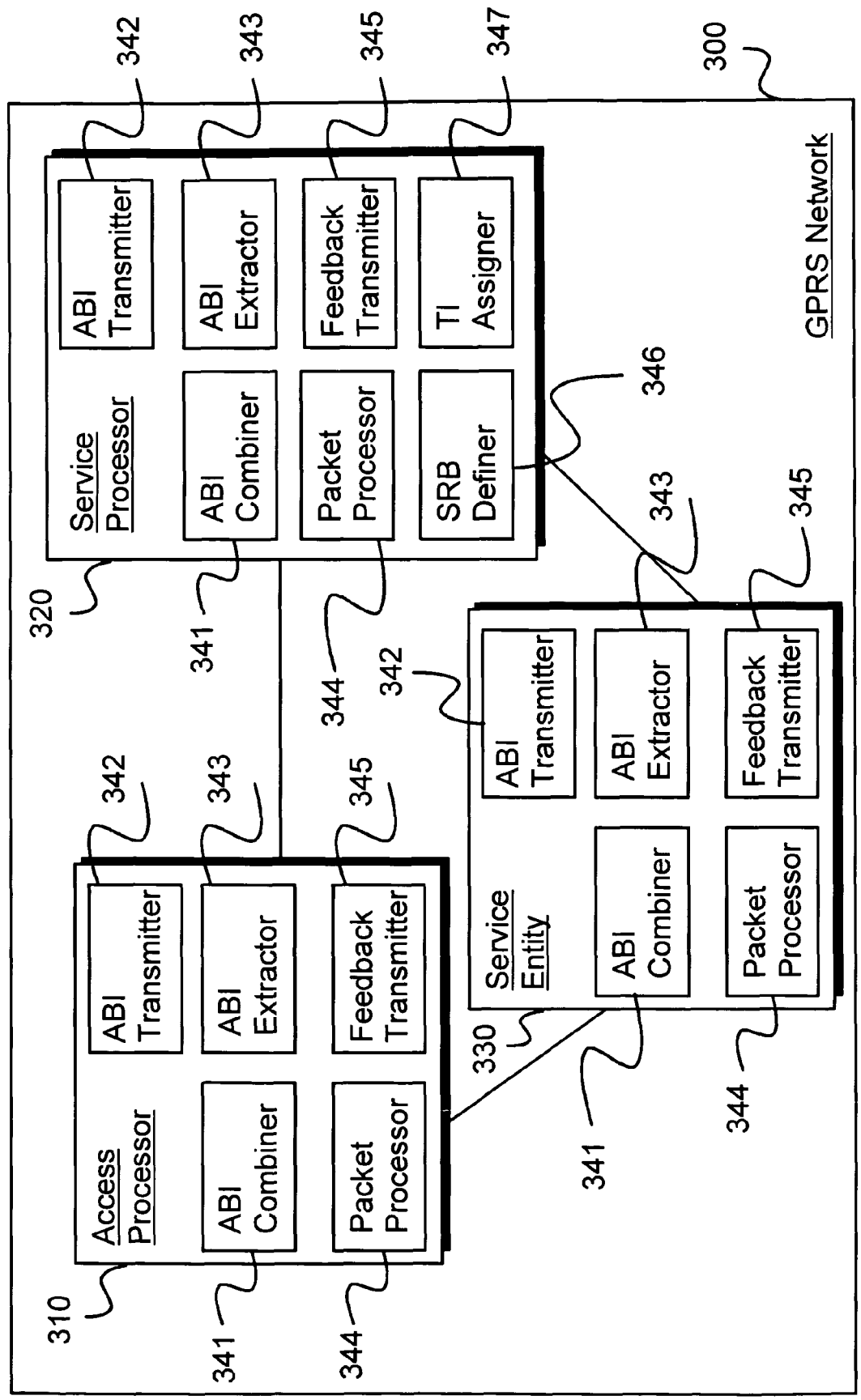

FIG. 3 illustrates an exemplary embodiment of the system of the present invention relating to providing access bearer related information in a packet data network 300. In the exemplary embodiment of FIG. 3 the packet data network 300 comprises a General Packet Radio Service based wireless communication network. However, the present invention applies as well to e.g. Wireless Local Area Network based wireless communication networks, Code Division Multiple Access based wireless communication networks, Wideband Code Division Multiple Access based wireless communication networks, and Enhanced Data Rates for Global Evolution based wireless communication networks.

The packet data network 300 comprises an access processor 310 for processing access requests, a service processor 320 for processing service requests, and at least one service entity 330 for providing services. Typical real world implementations would include multiple service entities but, for the sake clarity, only one is illustrated in FIG. 3. Furthermore, as described above, the access processor 310, the service processor 320 and the service entity 330 of the present invention are independent network entities, that is, the access processor 310, the service processor 320 and the service entity 330 are functionally separate from each other as well as from any other network elements. The access processor 310, the service processor 320 and the service entity 330 may be implemented as stand-alone network elements physically separate from each other as well as from any other network elements. Alternatively, at least one of the access processor 310, the service processor 320 and the service entity 330 may be implemented e.g. as a functionally separate software process, kernel module or hardware module integrated into a single physical network element, e.g. into a Gateway GPRS Support Node (not illustrated in FIG. 3) of the packet data network 300. In other words, being independent or functionally separate, at least two of the access processor 310, the service processor 320 and the service entity 330 may be run by a single CPU (central processing unit) or NPU (numeric processing unit) as separate functions or separate lines of code in a same function.

The exemplary system illustrated in FIG. 3 comprises an access bearer identification combiner 341 for combining an access bearer identification with a data packet to be transmitted between the service entity 330 and the access processor 310, or between the service entity 330 and service processor 320, or between the access processor 310 and the service processor 320. As described above, the access bearer identification indicates the access bearer that the data packet is associated with. In the exemplary embodiment of FIG. 3, an access bearer identification combiner 341 is arranged into the access processor 310, the service processor 320 and the service entity 330.

The exemplary system illustrated in FIG. 3 further comprises a service rule base definer 346 for defining at least one service rule base mapping service data flow specific service rules together. The exemplary system illustrated in FIG. 3 further comprises a transport identifier assigner 347 for assigning a transport identifier, indicating a transport method, to each defined service rule base. In the exemplary embodiment of FIG. 3, the service rule base definer 346 and the transport identifier assigner 347 are arranged in connection with the service processor 320. Naturally, at least one of the service rule base definer 346 and the transport identifier assigner 347 may as well be arranged in connection with the access processor 310, the service entity 330, or some other network element. Furthermore, at least one of the service rule base definer 346 and the transport identifier assigner 347 may be comprised in a network element dedicated solely for it.

The exemplary system illustrated in FIG. 3 further comprises an access bearer identification transmitter 342 for transmitting the combined access bearer identification and data packet according to the transport method indicated by the transport identifier assigned to the service rule base to be used for the data packet. In the exemplary embodiment of FIG. 3, an access bearer identification transmitter 342 is arranged into the access processor 310, the service processor 320 and the service entity 330. The exemplary system illustrated in FIG. 3 further comprises an access bearer identification extractor 343 for extracting the received access bearer identification. In the exemplary embodiment of FIG. 3, an access bearer identification extractor 343 is arranged into the access processor 310, the service processor 320 and the service entity 330.

The exemplary system illustrated in FIG. 3 further comprises a data packet processor 344 for processing a received data packet by utilizing an access bearer identification received with the data packet. In the exemplary embodiment of FIG. 3, a data packet processor 344 is arranged into the access processor 310, the service processor 320 and the service entity 330. The exemplary system illustrated in FIG. 3 further comprises a feedback transmitter 345 for transmitting feedback information back to the access processor 310, the service processor 320 or the service entity 330 from which a combined access bearer identification and data packet was received, the feedback information indicating results of the processing of the received data packet. In the exemplary embodiment of FIG. 3, a feedback transmitter 345 is arranged into the access processor 310, the service processor 320 and the service entity 330.

At least one of the access bearer identification combiner 341, access bearer identification transmitter 342, access bearer identification extractor 343, data packet processor 344, feedback transmitter 345, service rule base definer 344, and transport identifier assigner 345 may be implemented in software, hardware, or in a combination of software and hardware.

It is obvious to a person skilled in the art that with the advancement of technology, the basic idea of the invention may be implemented in various ways. The invention and its embodiments are thus not limited to the examples described above, instead they may vary within the scope of the claims.

What is claimed is:

1. A method comprising:
    obtaining, in an access processor, an access bearer identifier of the access processor indicating an access bearer associated with a data packet;
    combining said obtained access bearer identifier with said data packet; and
    directing transmission of said combined access bearer identifier and data packet to an independent network entity;
    wherein the data packet is associated with a traffic flow and the data packet comprises a payload.

2. The method according to claim 1, further comprising:
    extracting the obtained access bearer identifier;
    processing the data packet by utilizing the obtained access bearer identifier; and
    directing transmission of feedback information back to an independent network entity from which said combined access bearer identifier and data packet are received, said feedback information indicating results of said processing.

3. The method according to claim 1, wherein said access bearer identifier comprises a packet data protocol (PDP) Context identifier indicating the PDP Context associated with said data packet.

4. The method according to claim 3, wherein said obtaining of said access bearer identifier further comprises at least one of:
    indicating a service data flow associated with said data packet using a service data flow identifier;
    indicating a packet flow associated with said data packet using a packet flow identifier; and
    indicating a service rule base to be used for said data packet using a service rule base identifier and to map service data flow specific service rules together.

5. The method according to claim 1, further comprising:
    defining at least one service rule base mapping service data flow specific service rules together; and
    assigning, to each defined service rule base, a transport identifier indicating a transport method; and
    wherein said directing transmission further comprises directing transmission of said combined access bearer identifier and data packet according to the transport method indicated by the transport identifier assigned to the service rule base to be used for said data packet.

6. A system, comprising:
    a network physical element configured to combine a data packet with an obtained access bearer identifier of an access processor indicating an access bearer associated with said data packet; and
    an access bearer identifier transmitter configured to transmit said combined access bearer identifier and data packet to an independent network entity;
    wherein the data packet is associated with a traffic flow and the data packet comprises a payload.

7. The system according to claim 6, wherein the system further comprises:
    an access bearer identifier extractor configured to extract the obtained access bearer identifier;
    a data packet processor configured to process the data packet by utilizing the obtained access bearer identifier; and
    a feedback transmitter configured to transmit feedback information back to an independent network entity from which said combined access bearer identifier and data packet are received, said feedback information indicating results of said processing of said data packet.

8. The system according to claim 6, wherein the system further comprises:
    a service rule base definer configured to define at least one service rule base mapping service data flow specific service rules together; and
    a transport identifier assigner configured to assign, to each defined service rule base, a transport identifier indicating a transport method; and
    wherein said access bearer identifier transmitter is configured to transmit said combined access bearer identifier and data packet according to the transport method indicated by the transport identifier assigned to the service rule base to be used for said data packet.

9. A system, comprising:
    an access bearer identifier combining means for combining a data packet with an obtained access bearer identifier of an access processing means indicating an access bearer associated with said data packet; and
    an access bearer identifier transmitting means for transmitting said combined access bearer identifier and data packet to an independent network entity;
    wherein the data packet is associated with a traffic flow and the data packet comprises a payload.

10. An apparatus comprising at least one processor and at least one memory including computer program code, the at least one memory and the computer program code configured to, with the at least one processor, cause the apparatus at least to:
    combine a data packet with an obtained access bearer identifier indicating an access bearer associated with said data packet, and
    direct transmission of said combined access bearer identifier and data packet to an independent network entity;
    wherein the data packet is associated with a traffic flow and the data packet comprises a payload.

11. An apparatus comprising at least one processor and at least one memory including computer program code, the at least one memory and the computer program code configured to, with the at least one processor, cause the apparatus at least to:
    combine a data packet with an obtained access bearer identifier indicating an access bearer associated with a data packet; and
    direct transmission of said combined access bearer identifier and data packet to an independent network entity;
    wherein the data packet is associated with a traffic flow and the data packet comprises a payload.

12. An apparatus, comprising:
    an access bearer identifier combining means for combining a data packet with an obtained access bearer identifier indicating an access bearer associated with said data packet, and
    an access bearer identifier transmitting means for directing transmission of said combined access bearer identifier and data packet to an independent network entity;
    wherein the data packet is associated with a traffic flow and the data packet comprises a payload.

13. A computer readable device having a computer program stored thereon, the computer program being configured to control a processor to perform:

obtaining an access bearer identifier indicating an access bearer associated with a data packet;

combining said obtained access bearer identifier with said data packet; and directing transmission of said combined access bearer identifier and data packet to an independent network entity;

wherein the data packet is associated with a traffic flow and the data packet comprises a payload.

14. The computer readable device of claim 13, wherein the computer program is further configured to control the processor to perform:

extracting the obtained access bearer identifier;

processing the data packet by utilizing the obtained access bearer identifier; and directing transmission of feedback information back to an independent network entity from which said combined access bearer identifier and data packet are received, said feedback information indicating results of said processing;

wherein the data packet is associated with a traffic flow and the data packet comprises a payload.

15. The computer readable device of claim 14, wherein the computer program is further configured to control the processor to perform:

defining at least one service rule base mapping service data flow specific service rules together; and assigning, to each defined service rule base, a transport identifier indicating a transport method; and wherein said transmitting further comprises transmitting said combined access bearer identifier and data packet according to the transport method indicated by the transport identifier assigned for the service rule base to be used for said data packet.

16. A method comprising:

obtaining, in an access processor, an access bearer identifier indicating an access bearer associated with a data packet by extracting the access bearer identifier;

combining said obtained access bearer identifier with said data packet; and directing transmission of said combined access bearer identifier and data packet to an independent network entity;

wherein the data packet is associated with a traffic flow and the data packet comprises a payload.

17. An apparatus comprising at least one processor and at least one memory including computer program code, the at least one memory and the computer program code configured to, with the at least one processor, cause the apparatus at least to:

obtain an access bearer identifier of an access processor indicating an access bearer associated with a data packet;

combine the data packet with the access bearer identifier indicating an access bearer associated with said data packet; and direct transmission of said combined access bearer identifier and data packet to an independent network entity;

wherein the data packet is associated with a traffic flow and the data packet comprises a payload.

18. An apparatus comprising at least one service processor and at least one memory including computer program code, the at least one memory and the computer program code configured to, with the at least one service processor, cause the apparatus at least to:

combine a data packet with an obtained access bearer identifier indicating an access bearer associated with said data packet; and directing transmission of said combined access bearer identifier and data packet to an independent network entity;

wherein the data packet is associated with a traffic flow and the data packet comprises a payload.

19. A service entity comprising at least one processor and at least one memory including computer program code, the at least one memory and the computer program code configured to, with the at least one processor, cause the service entity at least to:

combine a data packet with an obtained access bearer identifier indicating an access bearer associated with said data packet; and direct transmission of said combined access bearer identifier and data packet to an independent network entity;

wherein the data packet is associated with a traffic flow and the data packet comprises a payload.

20. The apparatus according to claim 10, wherein the apparatus is further caused to:

extract the obtained access bearer identifier;

process the data packet by utilizing the obtained access bearer identifier; and direct transmission of feedback information back to an independent network entity from which said combined access bearer identifier and data packet are received, said feedback information indicating results of said processing.

21. The apparatus according to claim 10, wherein the apparatus caused to combine the data packet with the obtained access bearer identifier of an access processor indicating an access bearer associated with said data packet includes being caused to combine the data packet with the obtained access bearer identifier, wherein said access bearer identifier comprises a packet data protocol (PDP) Context identifier indicating the PDP Context associated with said data packet.

* * * * *